United States Patent
Hendricks

(10) Patent No.: US 8,528,318 B2
(45) Date of Patent: Sep. 10, 2013

(54) CAMBERED AERO-ENGINE INLET

(75) Inventor: Gavin Hendricks, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/572,780

(22) Filed: Aug. 13, 2012

(65) Prior Publication Data

US 2013/0034431 A1  Feb. 7, 2013

Related U.S. Application Data

(62) Division of application No. 12/434,290, filed on May 1, 2009, now Pat. No. 8,261,530.

(51) Int. Cl.
*F02K 3/02* (2006.01)

(52) U.S. Cl.
USPC ....... 60/226.1; 137/15.1; 137/15.2; 244/53 B; 181/214

(58) Field of Classification Search
USPC .... 60/226.1, 262; 137/15.1, 15.2; 244/53 B; 181/214
See application file for complete search history.

(56) References Cited

U.S. PATENT DOCUMENTS

| | | | |
|---|---|---|---|
| 3,765,623 A | 10/1973 | Donelson et al. | |
| 4,209,149 A | 6/1980 | Morris et al. | |
| 4,220,171 A | 9/1980 | Ruehr et al. | |
| 4,722,357 A | 2/1988 | Wynosky | |
| 5,000,399 A | 3/1991 | Readnour et al. | |
| 5,058,617 A | 10/1991 | Stockman et al. | |
| 5,156,362 A | 10/1992 | Leon | |
| 5,448,881 A | 9/1995 | Patterson et al. | |
| 5,915,403 A | 6/1999 | McConachie et al. | |
| 7,476,086 B2 | 1/2009 | Wadia et al. | |
| 8,250,852 B2* | 8/2012 | Porte et al. | 60/226.1 |
| 8,261,530 B2* | 9/2012 | Hendricks | 60/226.1 |
| 2003/0084936 A1 | 5/2003 | Surply et al. | |
| 2007/0163229 A1 | 7/2007 | Prasad et al. | |
| 2007/0176052 A1 | 8/2007 | Chanez et al. | |
| 2008/0267762 A1 | 10/2008 | Jain et al. | |
| 2009/0003997 A1 | 1/2009 | Jain et al. | |
| 2010/0019100 A1* | 1/2010 | Smith et al. | 244/53 B |

FOREIGN PATENT DOCUMENTS

EP  1308387  7/2006

* cited by examiner

*Primary Examiner* — William H Rodriguez
(74) *Attorney, Agent, or Firm* — Kinney & Lange, P.A.

(57) ABSTRACT

A propulsion system includes an engine with a fan and a nacelle that circumscribes the engine. The engine defines an axis. A distance between a forwardmost point at the top of the nacelle and at the front of the nacelle to a forwardmost point of the fan is greater than a distance between a forwardmost point at the bottom of the nacelle and at the front of the nacelle.

18 Claims, 3 Drawing Sheets

CAMBERED AERO-ENGINE INLET

CROSS-REFERENCE TO RELATED APPLICATION(S)

This application is a divisional of U.S. patent application Ser. No. 12/434,290, filed May 1, 2009, entitled "CAMBERED AERO-ENGINE INLET".

BACKGROUND

The present invention relates generally to gas turbine engines, and more particularly, to turbofan aircraft engines.

One of the primary design criteria for aircraft turbofan engines is to propel an aircraft in flight with maximum efficiency, thereby reducing fuel consumption. Thus, turbofan engines are continually being developed and improved to maximize thrust capability with the greatest aerodynamic efficiency possible.

One of the components of the turbofan engine is an array of fan blades, which are positioned adjacent the forward portion of the turbofan adjacent the turbofan's inlet. The fan blades produce thrust, and thus, are typically designed to maximize the aerodynamic loading and the amount of propulsion thrust generated thereby during operation. However, fan loading is limited by stall, flutter, or other instability parameters of the air being pressurized.

Fan stall margin is a fundamental design requirement for the turbofan and is affected by aerodynamic fan loading. A major factor affecting the aerodynamic loading of the fan is the geometry of the inlet upstream of the fan. Aircraft wings are known to induce an upwash velocity in airflow in the inlet. Unfortunately, conventional inlets do not account sufficiently for the vertical component (vector) of the airflow. The circumferential vector of the airflow causes the fan to operate with different circumferential sectors having different flow-pressure ratio characteristics. Specifically, the circumferential vector of the inlet airflow manifests itself as a swirl velocity along the face of the fan blades. The swirl velocity is in a direction counter to the direction of rotation of the fan along at least a portion of the fan face. The swirl velocity has a destabilizing effect on the flow condition over sector(s) of the fan, and thus, degrades the stall margin of the fan.

Similarly, the different flow-pressure ratio characteristics on the fan produce a circumferential variation in total pressure at the inlet to the core stream of the turbofan. The total pressure variation (distortion) has a destabilizing effect on the operation of the low pressure compressor and high pressure compressor sections of the turbofan.

SUMMARY

An inlet of a nacelle for channeling inlet airflow to a fan of a gas turbine engine includes a forward lip and an inner surface. The forward lip extends around a centerline axis of the engine and is adapted to accommodate a flow angle of incoming airflow. The inner surface extends from the forward lip along the centerline axis of the engine to adjacent the fan. The inner surface has a first profile above the centerline axis of the engine and a second profile below the centerline axis of the engine. The first profile and the second profile are adapted to define an inlet centerline axis that extends below the centerline axis of the engine at a face of the fan.

DETAILED DESCRIPTION

Figure 1:
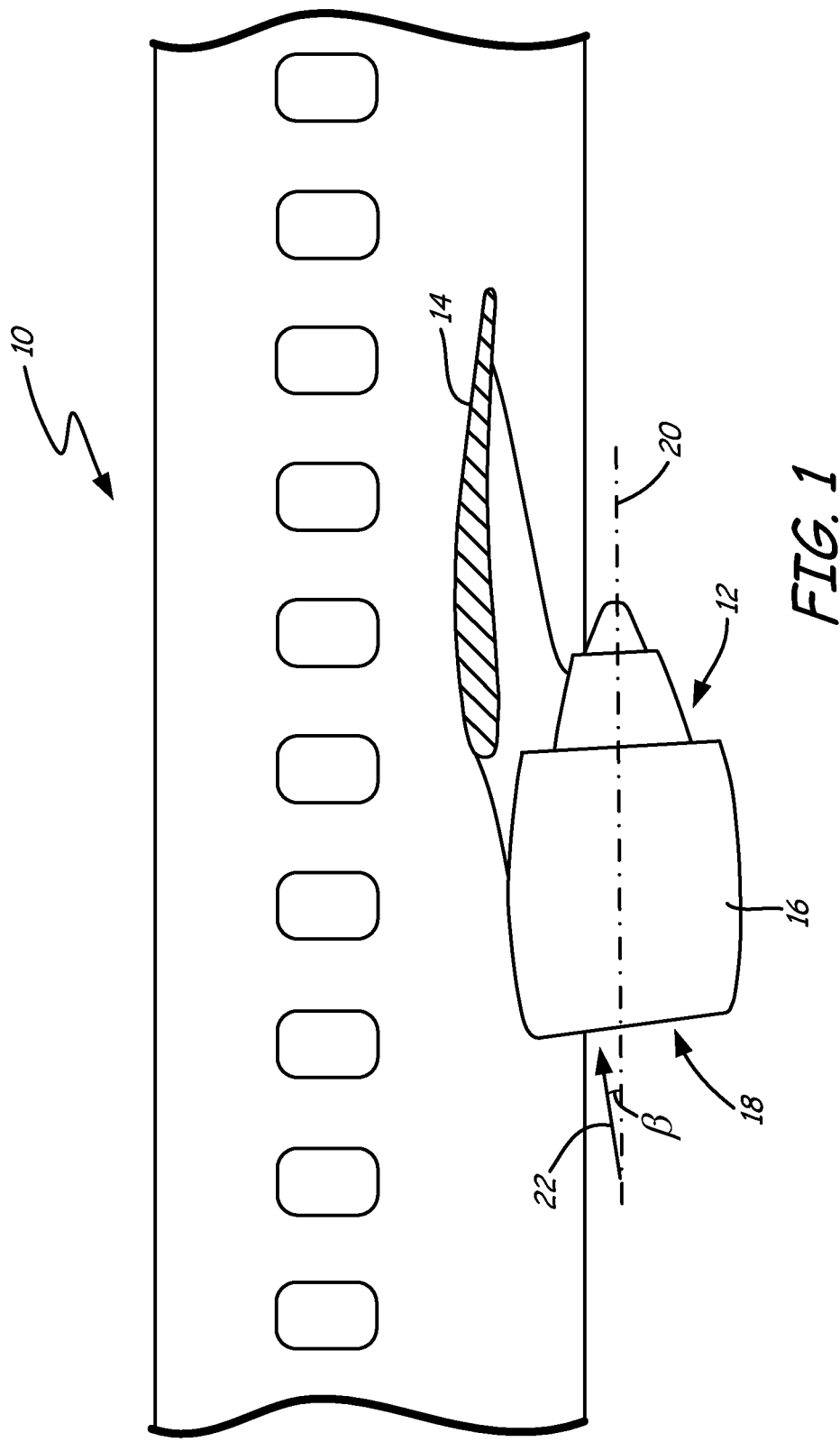
FIG. 1 is a schematic representation of a portion of an aircraft having a wing mounted gas turbine engine including a nacelle inlet.

FIG. 1 shows an exemplary portion of an aircraft 10 having at least one gas turbine engine 12 mounted to one wing 14 thereof. The engine 12 includes a nacelle 16 that defines an inlet 18.

The engine 12 is disposed around an engine centerline axis 20. The nacelle 16 is an aerodynamic structure that surrounds at least a portion of the engine 12 and forms an inlet 18 thereto. The nacelle 16 channels free stream airflow 22 through the inlet 18 to the internal components of the engine 12. Adjacent to the inlet 18 and wing 14, the free stream airflow 22 has an upwash angle $\beta$ with respect to the engine centerline axis 20. The upwash angle $\beta$ is due to the aerodynamic affects of the wing 14. The upwash angle $\beta$ exists in the inlet airflow after the free stream airflow 22 enters the inlet 18.

As will be discussed subsequently, the portion of the nacelle 16 that defines the inlet 18 is adapted to align the upwash angle $\beta$ with the engine centerline axis 20 at a fan within the engine 12. The alignment of the upwash angle $\beta$ with the engine centerline axis 20 reduces or eliminates the vertical vector of the inlet airflow that causes a swirl velocity along the face of the fan blades. The reduction or elimination of the swirl velocity allows components of the engine 12 to better meet fan stall margin requirements and improves aerodynamic fan loading.

Figure 2:
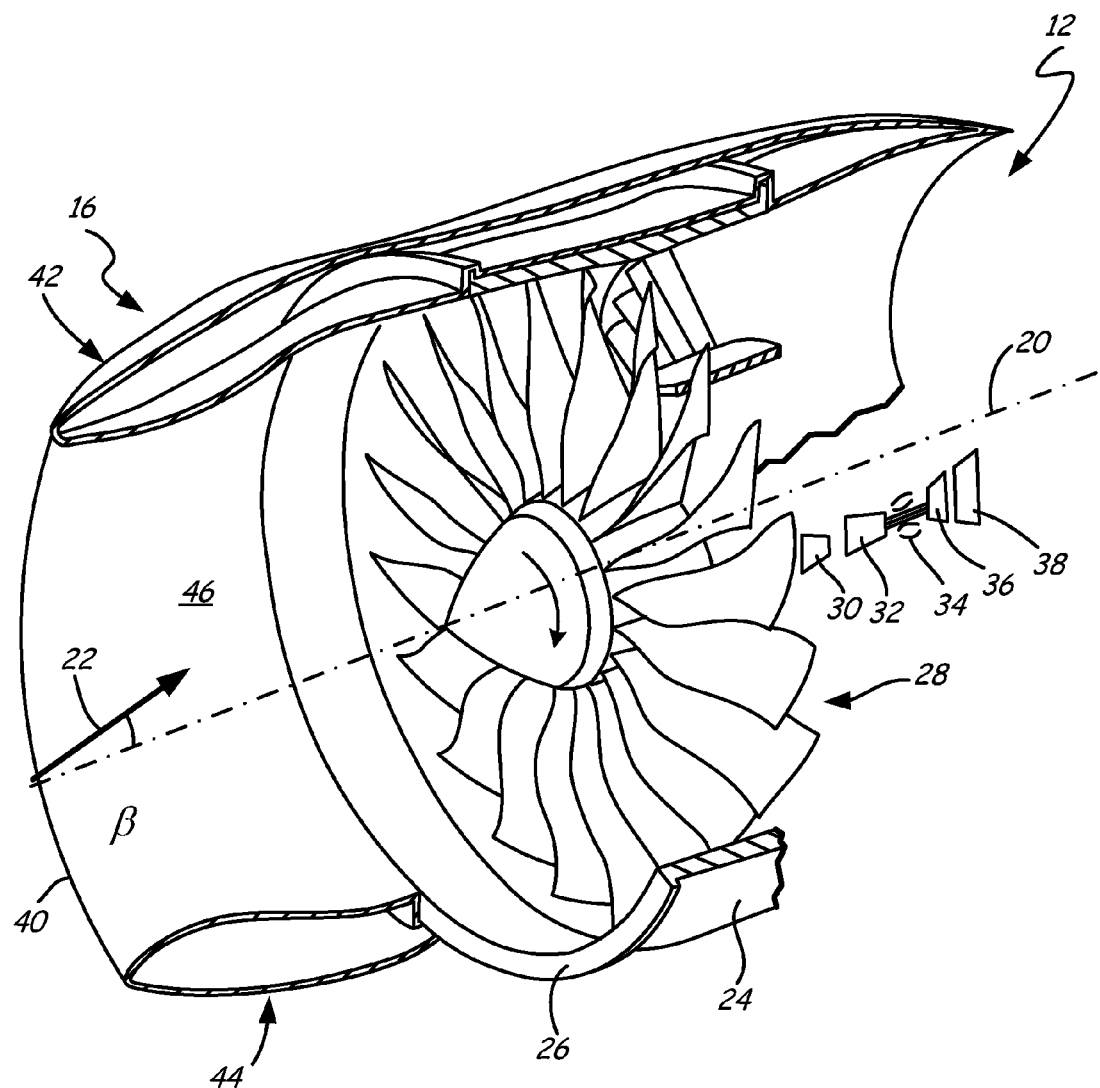
FIG. 2 is a partially schematic partially sectional view of the turbofan portion of the gas turbine engine of FIG. 1.

FIG. 2 shows a section of the turbofan portion of the gas turbine engine 12. The engine 12 includes a fan case 24 having a fan case flange 26, a fan 28, a low pressure compressor 30, a high pressure compressor 32, a combustor 34, a high pressure turbine 36, and a low pressure turbine 38. The nacelle 16 includes forward lip portion 40, a crown portion 42, a keel portion 44 and an inner surface 46.

In FIG. 2, a section of the nacelle 16 has been removed along a vertical plane extending through top dead center and bottom dead center thereof. The nacelle 16 connects to and extends around the axisymmetrical fan case 24. The fan case flange 26 extends generally radially outward from the forward portion of the fan case 24 to connect to the nacelle 16. The portion of the nacelle 16 that defines the inlet 18 extends forward of the fan case 24 and fan case flange 26. The fan 28 is rotationally mounted within the fan case 24 and is co-aligned along the same axis as the engine centerline axis 20. The low pressure compressor 30, high pressure compressor 32, combustor 34, high pressure turbine 36, and low pressure turbine 38 extend in series axially downstream (rearward) of the fan 28.

The forward lip 40 of the nacelle 16 defines the forward portion of the inlet 18. The forward lip 40 extends around the engine centerline axis 20. The nacelle 16 can generally be divided into the crown portion 42, which extends generally above the engine centerline axis 20, and the keel portion 44, which extends generally below the engine centerline axis 20. The crown portion 42 is asymmetrical with respect to the keel portion 44 but both together integrally extend around the engine centerline axis 20. The keel 44 can be dropped (i.e. adapted to have its portion of the forward lip 40 be disposed to the rearward of the forward lip 40 of the crown portion 42) such that the forward lip 40 does not extend along a vertical plane. This arrangement allows the inlet 18 to accommodate the upwash angle β of incoming airflow.

The inner surface 46 of the nacelle 16 defines a portion of the inlet 18 which also extends through the annular fan case 24 to the fan case flange 26. As will be discussed subsequently, the inner surface 46 of the nacelle 16 is profiled on both the crown portion 42 and the keel portion 44 to align the upwash of inlet airflow with the engine centerline axis 20 at the face of the fan 28.

During operation of the engine 12, the free stream airflow 22 enters the inlet 18, is aligned by the geometry of the nacelle 16, and is pressurized by the fan 28. A portion of the airflow is channeled to engine core where it is pressurized, mixed with fuel/combusted, and expanded before being expelled from the engine 12. A second portion of the airflow bypasses the engine core and is expelled from an outlet portion of the nacelle 16.

After being pressurized in the low pressure compressor 30 and high pressure compressor 32, the air is mixed with fuel in the combustor 34 for generating hot combustion gases. From the combustor 32, the gases and airflow are discharged downstream into the high pressure turbine 34. The high pressure turbine 34 and low pressure turbine 36 in turn receive the combusted gases and extract energy therefrom. The high pressure turbine 34 is joined by a rotor or shaft (not shown) to the high pressure compressor 32 and the fan 28 for powering these components during operation. The combination of thrust produced from the fan 28 and the components of the engine core propel the aircraft 10 in flight (FIG. 1).

Figure 3:
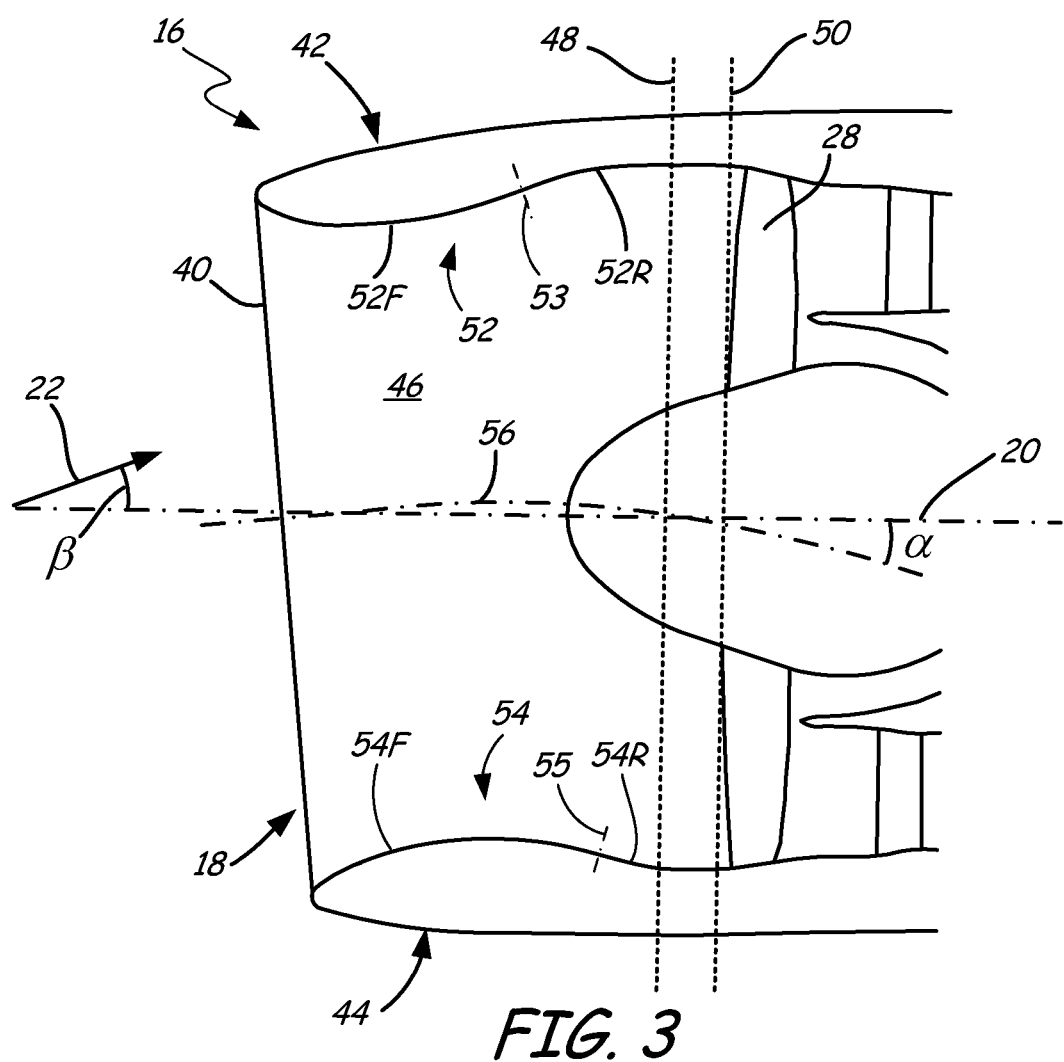
FIG. 3 is a schematic sectional view of the nacelle inlet and a fan shown in FIG. 2.
Figure 3:
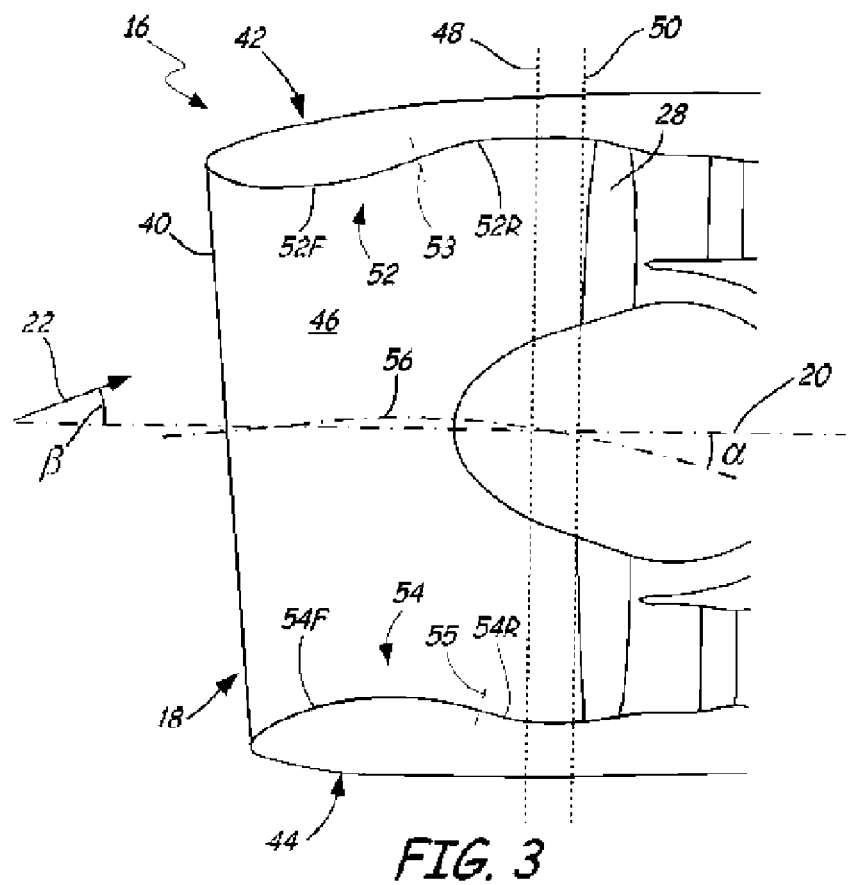

FIG. 3 shows a schematic sectional view of one embodiment of the nacelle 16 and the fan 28. The axially forward most extent of the fan case flange 26 is denoted by a fan case flange plane 48. Similarly, the axial forward most portion of the fan 28 is indicated by a fan face plane 50. The inner surface 46 of the nacelle 16 includes a first profile 52 and a second profile 54. The first profile 52 has a generally convex forward section 52F that transitions to a generally concave rearward section 52R (when observed from the engine centerline axis 20) at inflection point 53. Similarly, the second profile 54 has a generally convex forward section 54F that transitions to a generally concave rearward section 52R (when viewed from the engine centerline axis 20) at inflection point 55. The geometry of the inner surface 46 of the nacelle 16 defines an inlet centerline axis 56.

The forward lip 40 of the nacelle 16 defines the orifice of the inlet 18. The forward lip 40 extends around the engine centerline axis 20. The crown portion 42 of the nacelle 16 extends above the engine centerline axis 20. The keel portion 44 of the nacelle 16 extends below the engine centerline axis 20. Together both the crown portion 42 and the keel portion 44 form the inner surface 46. The inner surface 46 defines the inlet 18, which extends axially along the engine centerline axis 20 from the forward lip 40 to the fan case flange plane 48. The inner surface 46 also defines the inlet centerline axis 56 which approximates the geometric center of inlet 18.

The shape of the inner surface 46 above the engine centerline axis 20 is asymmetrical with respect to the shape of the inner surface 46 below the engine centerline axis 20. More particularly, the inner surface 46 above the engine centerline axis 20 is shaped with the first profile 52, which extends generally axially along the engine centerline axis 20 from the forward lip 40 to at least the fan case flange plane 48. The first profile 52 varies in the radial distance it is disposed from the engine centerline axis 20. Similarly, the inner surface 46 below the engine centerline axis 20 is shaped with the second profile 54, which extends generally axially along the engine centerline axis 20 from the forward lip 40 to at least the fan case flange plane 48. The second profile 54 varies in the radial distance it is disposed from the engine centerline axis 20.

For most of the axial travel of the first profile 52 and second profile 54 along the engine centerline axis 20, the radial distance the first profile 52 is disposed from the engine centerline axis 20 differs from the radial distance the second profile 54 is disposed from the engine centerline axis 20. Thus, the volume and cross sectional area of the inlet 18 above the engine centerline axis 20 generally differs from the volume and cross sectional area of the inlet 18 below the engine centerline axis 20. The difference in geometry between the first and second profiles 52 and 54 is approximated by the inlet centerline axis 56 (which approximates the geometric center of the inlet 18), which has a cambered shape with respect to the engine centerline axis 20.

The inflection point 53 of the first profile 52 is radially and axially offset along the engine centerline axis 20 from the inflection point 55 of the second profile 54. More particularly, the convex forward section 54F (when viewed from the engine centerline axis 20) of the second profile 54 extends further rearward toward the fan face plane 50 than does the convex forward section 52F of the first profile 52. Terms such as "forward," "rearward," "upstream," and "downstream" are defined by the direction of airflow 22 within the inlet 18. Thus, the concave rearward section 52R (when viewed from the engine centerline axis 20) of the first profile 52 extends further forward away from the fan face plane 50 than does the concave rearward section 54R of the second profile 54. This geometry disposes the inflection point 55 between the convex and concave sections (54F and 54R) of the second profile 54 closer to the face of the fan 28 than the inflection point 53 between the convex and concave sections (52F and 54R) of the first profile 52.

In particular, the convex forward section 54F of the second profile 54 is geometrically accentuated relative to the concave rearward section 54R of the second profile 54 and the convex forward section 52F of the first profile 52. Similarly, the concave rearward section 52R of the first profile 52 is geometrically accentuated relative to the convex forward section 52F of the first profile 52 and the concave rearward section 54R or the second profile 54. The precise interrelation of profiles 52 and 54 (i.e. the precise geometric accentuation of the concave/convex sections 52F, 52R, 54F, 54R relative to one another) is achieved through computational fluid mechanics. The different axial and radial geometry of the inner surface 46 above the engine centerline axis 20 with respect to the axial and radial geometry of the inner surface 46 below the engine centerline axis 20 cambers the inlet centerline axis 56 with respect to the engine centerline axis 20.

In one embodiment, the geometry of the first profile 52 with respect to the second profile 54 disposes the inlet centerline axis 56 radially above the engine centerline axis 20 immediately to the rear of the forward lip 40 within the inlet 18. The inlet centerline axis 56 extends above the engine centerline axis 20 for a portion of its axial extent within the inlet 18. In one embodiment, the geometry of the first profile 52 with respect to the second profile 54 about the engine centerline axis 20 causes the inlet centerline axis 56 to have an acute descending depression angle a at the fan case flange plane 48. In one embodiment, the acute depression angle a the inlet centerline axis 56 forms with respect to the engine centerline axis 20 offsets any residual upwash of the airflow 22 entering the inlet 18.

The geometry of the inner surface 46 allows the airflow 22 in the inlet 18 to substantially align with the engine centerline axis 20 (which is also the rotational axis of the fan 28) at the face of the fan 28. In the embodiment shown, the inlet centerline axis 56 coincident with the engine centerline axis 20 at the fan case flange plane 48. In other embodiments, the inlet centerline axis 56 can merge with or be coincident with the engine centerline axis 20 forward (as defined by the direction of airflow 22) of the fan case flange plane 48.

Figure 4:
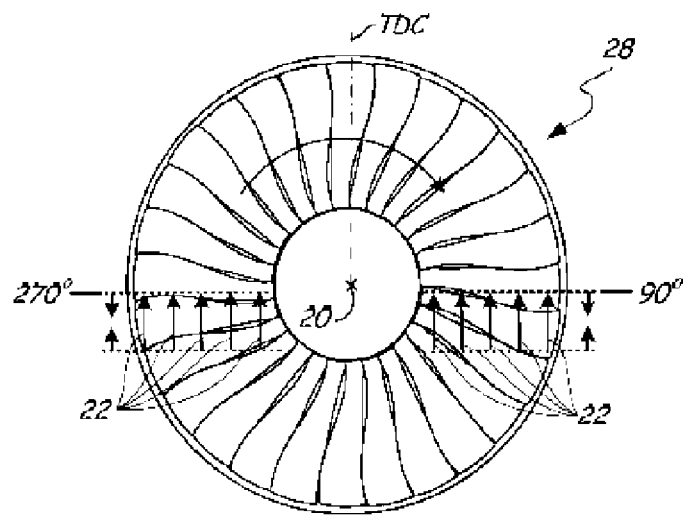
FIG. 4 is a diagrammatic view of the front of the fan showing a decrease in an airflow swirl velocity.

As illustrated in FIG. 4, an airflow 22 swirl velocity on the face of the fan 28 at 90° and 270° to top dead center (TDC) is reduced or eliminated by offsetting the first profile 52 with respect to the second profile 54. The elimination of the swirl velocity occurs because the inlet centerline axis 56 extends below the engine centerline axis 20 and aligns the airflow 22 in the inlet 18 with the engine centerline axis 20 at the face of the fan 28. By aligning the airflow 22 in the inlet 18 generally with the engine centerline axis 20, the vertical vector of the airflow 22 that causes the airflow 22 swirl velocity is reduced or eliminated. Thus, the swirl velocity at 270° (measured from TDC of the fan 28), co-rotating with the fan 28 (when the fan 28 is rotating in a clockwise direction), and the swirl velocity at 90° counter-rotating with the fan 28 (when the fan 28 is rotating in a clockwise direction) are reduced or eliminated. The reduction or elimination of the airflow 22 swirl velocity allows the components of the engine 12 to better meet fan stall margin requirements and improves aerodynamic loading.

Although the present invention has been described with reference to preferred embodiments, workers skilled in the art will recognize that changes may be made in form and detail without departing from the spirit and scope of the invention.

The invention claimed is:

1. A propulsion system comprising:
   an engine defining an engine centerline axis, the engine including a fan; and
   a nacelle circumscribing the engine, wherein a distance between a forwardmost point at the top of the nacelle and at the front of the nacelle to a forwardmost point of the fan is greater than a distance between a forwardmost point at the bottom of the nacelle and at the front of the nacelle; and wherein an axial and a radial geometry of an inner surface of the nacelle above the engine centerline axis differs from an axial and a radial geometry of the inner surface of the nacelle below the engine centerline axis to give an inlet centerline axis of the nacelle a cambered shape with respect to the engine centerline axis such that the inlet centerline axis extends radially above the engine centerline axis within the nacelle.

2. The propulsion system of claim 1, wherein the inlet centerline axis is coincident with the engine centerline axis one or more times before reaching a fan case flange plane within the nacelle.

3. The propulsion system of claim 1, wherein the inlet centerline axis forms an acute depression angle relative to the engine centerline axis at the fan case flange plane.

4. The propulsion system of claim 1, wherein the inlet centerline axis is disposed radially below the engine centerline axis at a forward lip of the nacelle.

5. The propulsion system of claim 1, wherein the inlet centerline axis forms an acute depression angle relative to the engine centerline axis at a fan face plane within the nacelle.

6. The propulsion system of claim 5, wherein the inlet centerline axis is disposed radially below the engine centerline axis between the fan case flange plane and the fan face plane.

7. A propulsion system comprising:
   an engine defining an engine centerline axis, the engine including a fan; and
   a nacelle circumscribing the engine, wherein an axial and a radial geometry of an inner surface of the nacelle above the engine centerline axis differs from an axial and a radial geometry of the inner surface of the nacelle below the engine centerline axis to give an inlet centerline axis of the nacelle a cambered shape with respect to the engine axis such that the inlet centerline axis forms an acute depression angle relative to the engine centerline axis at a fan case flange plane within the nacelle.

8. The propulsion system of claim 7, wherein the inlet centerline axis is coincident with the engine centerline axis one or more times before reaching the fan case flange plane.

9. The propulsion system of claim 7, wherein the inlet centerline axis is disposed radially below the engine centerline axis at a forward lip of the nacelle.

10. The propulsion system of claim 7, wherein the inlet centerline axis forms the acute depression angle relative to the engine centerline axis at a fan face plane within the nacelle.

11. The propulsion system of claim 10, wherein the inlet centerline axis is disposed radially below the engine centerline axis between the fan case flange plane and the fan face plane.

12. The propulsion system of claim 7, wherein the inlet centerline axis extends radially above the engine centerline axis within the nacelle.

13. A propulsion system comprising:
    an engine defining an engine centerline axis, the engine including a fan; and
    a nacelle circumscribing the engine, wherein an axial and a radial geometry of an inner surface of the nacelle above the engine centerline axis differs from an axial and a radial geometry of the inner surface of the nacelle below the engine centerline axis to give an inlet centerline axis of the nacelle a cambered shape with respect to the engine axis such that the inlet centerline axis is coincident with the engine centerline axis one or more times before reaching a fan case flange plane within the nacelle.

14. The propulsion system of claim 13, wherein the inlet centerline axis forms an acute depression angle relative to the engine centerline axis at the fan case flange plane.

15. The propulsion system of claim 13, wherein the inlet centerline axis is disposed radially below the engine centerline axis at a forward lip of the nacelle.

16. The propulsion system of claim 13, wherein the inlet centerline axis forms an acute depression angle relative to the engine centerline axis at a fan face plane within the nacelle.

17. The propulsion system of claim 16, wherein the inlet centerline axis is disposed radially below the engine centerline axis between the fan case flange plane and the fan face plane.

18. The propulsion system of claim 13, wherein the inlet centerline axis extends radially above the engine centerline axis within the nacelle.

\* \* \* \* \*

UNITED STATES PATENT AND TRADEMARK OFFICE
CERTIFICATE OF CORRECTION

| | | |
|---|---|---|
| PATENT NO. | : 8,528,318 B2 | |
| APPLICATION NO. | : 13/572780 | |
| DATED | : September 10, 2013 | |
| INVENTOR(S) | : Gavin Hendricks | |

It is certified that error appears in the above-identified patent and that said Letters Patent is hereby corrected as shown below:

In the Drawings

Sheet 3 of 3 is deleted and replaced therefore with the attached sheet 3 of 3 showing the addition of Fig. 4.

Signed and Sealed this
Nineteenth Day of April, 2016

Michelle K. Lee
*Director of the United States Patent and Trademark Office*